No. 851,370. PATENTED APR. 23, 1907.
J. NOLAN.
VALVE.
APPLICATION FILED JAN. 10, 1906.
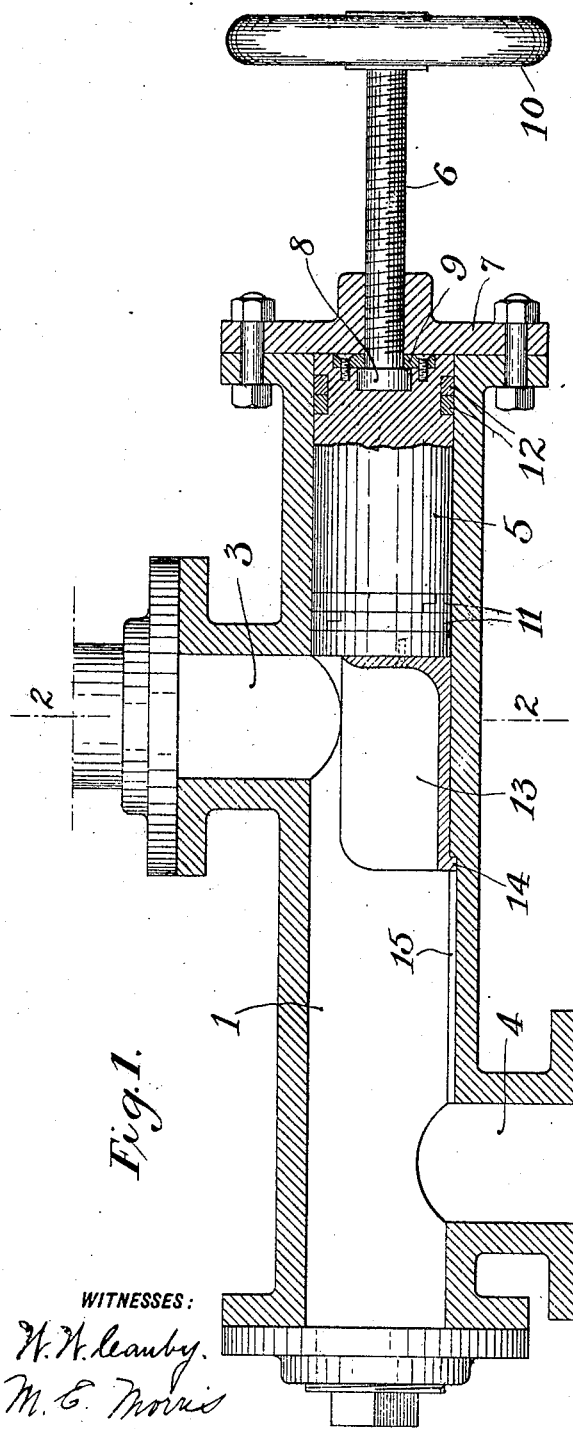
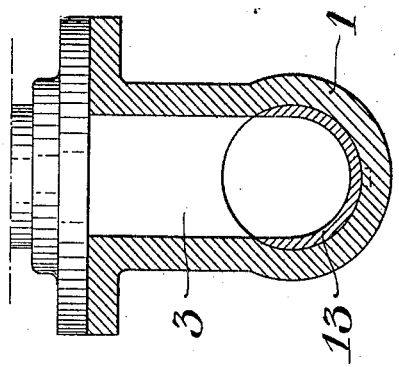
WITNESSES:
INVENTOR
ATTORNEY

UNITED STATES PATENT OFFICE.

JOHNSTON NOLAN, OF PHILADELPHIA, PENNSYLVANIA.

VALVE.

No. 851,370.   Specification of Letters Patent.   Patented April 23, 1907.

Application filed January 10, 1906. Serial No. 295,352.

*To all whom it may concern:*

Be it known that I, JOHNSTON NOLAN, a citizen of the United States, residing at Philadelphia, in the county of Philadelphia and State of Pennsylvania, have invented certain new and useful Improvements in Valves, of which the following is a specification.

This invention relates to valves and especially to blow-off valves for steam boilers.

The object of the invention is to provide a valve of simple and efficient construction whereby the inlet opening may be tightly closed and whereby the valve seat may be protected from injury by anything passing through the valve.

The invention consists in the novel construction and combinations of parts hereinafter fully described and claimed.

In drawings: Figure 1 is a longitudinal section through a valve embodying my invention. Fig. 2 is a transverse section thereof, as on the line 2—2 of Fig. 1.

1 designates a cylindrical casing having an inlet opening 3 in one side thereof and having also an outlet opening 4.

Fitted to the interior of the casing 1 is a piston 5 from which extends a screw-threaded stem 6 fitted to a screw-threaded opening in the end head 7 of the casing 1. The inner end of the stem 6 is provided with a collar 8 which is rotatably fitted to a socket in the end of the piston and held therein by a plate 9 surrounding the stem and secured to the piston 5. The outer end of the stem 6 is provided with a suitable hand wheel 10 by means of which the stem may be turned. Thus it will be seen that the stem 6 may be turned without turning the piston, and that by turning the stem, the piston will be moved longitudinally within the casing.

Surrounding the piston 5 near the respective ends thereof are packing rings 11 and 12 which, in the present embodiment of my invention, are metallic expansion rings fitted to annular grooves in the piston and adapted to afford a tight joint between the piston 5 and casing 1. The distance between the rings 11 and 12 is equal to or greater than the width of the inlet opening 3, to the end that, when the piston is moved into register with the opening 3 the rings 11 and 12 will engage the wall of the casing on each side of the opening and thus effectually prevent the escape of steam from the opening 3 either toward the outlet opening 4 or the stem 6. Secured to the head of the piston and fitted to the inner wall of the casing 1 is a guard 13. This guard extends around the inner wall of the casing to meet the sides of the opening 3 and it also extends in advance of the piston when it is in the position to close the opening 3. The purpose of this guard is to protect the inner wall of the casing 1 from anything that may be blown through the opening 3 forcibly against the said wall and thus preserve a true seat for the packing rings 11 and 12 when the piston is moved to close the opening 3. As previously stated, the guard 13 is secured to the piston 5, and consequently it is moved back and forth with the piston during the opening and closing of the valve.

The guard 13 is provided with a projection 14 which is slidingly fitted to a longitudinal groove 15 in the casing 1. This projection 14, engaging the side walls of the groove 15, serves to prevent the piston 5 from turning when the stem 6 is turned to move the piston.

I claim

1. In a valve, the combination of the cylindrical casing having an inlet opening in one side thereof and an outlet opening, the interior of the casing forming a valve seat, a piston within the casing and movable to open or close the inlet opening, packing rings surrounding the piston and engaging said seat, a guard slidingly fitted to the valve seat and carried by the piston, said guard occupying a position adjacent to the inlet opening when the valve is open, and means for moving the piston.

2. In a valve, the combination of the cylindrical casing having an inlet opening in one side thereof and an outlet opening, the interior of the casing forming a valve seat, a piston within the casing and movable to open or close the inlet opening, packing rings surrounding the piston and engaging said seat, a guard slidingly fitted to the valve seat and carried by the piston, said guard occupying a position adjacent to the inlet opening when the valve is open, a screw to move the piston, and means to prevent the rotation of the piston.

In testimony whereof I affix my signature in presence of two witnesses.

JOHNSTON NOLAN.

Witnesses:
M. E. MORRIS,
A. V. GROUPE.